United States Patent [19]
Cochrane

[11] Patent Number: 5,207,340
[45] Date of Patent: May 4, 1993

[54] SNAP-ON CLOSURE WITH DISCONTINUOUS ANNULAR LIP

[76] Inventor: Benjamin A. Cochrane, P.O. Box 835, Danville, Calif. 94526

[21] Appl. No.: 702,064

[22] Filed: May 17, 1991

Related U.S. Application Data

[63] Continuation-in-part of Ser. No. 368,250, Jun. 19, 1989, abandoned, which is a continuation of Ser. No. 335,767, Apr. 10, 1989, Pat. No. 4,951,830, which is a continuation-in-part of Ser. No. 947,043, Dec. 29, 1986, Pat. No. 4,819,906, which is a continuation-in-part of Ser. No. 709,534, Mar. 8, 1985, Pat. No. 4,632,265, which is a continuation-in-part of Ser. No. 507,342, Jun. 24, 1983, abandoned.

[51] Int. Cl.$^5$ .............................. B65D 41/32
[52] U.S. Cl. ................................ 215/256
[58] Field of Search ............... 215/254, 256; 220/270, 220/276

[56] References Cited

U.S. PATENT DOCUMENTS 4,032,029  6/1977  Cochrane ............... 215/256
4,531,650  7/1985  Friendship ............. 215/256
4,632,265  12/1986  Cochrane ............... 215/232

FOREIGN PATENT DOCUMENTS 1520808  8/1978  United Kingdom ........ 215/256

Primary Examiner—Allan N. Shoap
Assistant Examiner—Nova Stucker
Attorney, Agent, or Firm—Plante Strauss & Vanderburgh

[57] ABSTRACT

There is disclosed a snap-on closure for containers, such as milk and soft drink plastic bottles, which has upper and lower annular beads on the inside wall of a peripheral skirt with a tear band defined by a score line in the skirt, located between the annular beads. The score line extends towards, but not entirely to, the bottom edge of the skirt, terminating a short distance above the bottom edge of the skirt. This score line permits a tearing of the lower portion of the cap skirt from the closure, and for this purpose, the cap tears along the weakened score line, about the closure and then downwardly towards the bottom edge of the skirt so that the entire lower portion of the skirt is removed as a tear band, leaving only the reclosure on the bottle. Since the lower score line does not extend to the lower edge of the skirt, that lower edge is not weakened, but retains its full hoop strength, to resist splitting when the cap is applied to the bottle.

13 Claims, 4 Drawing Sheets

SNAP-ON CLOSURE WITH DISCONTINUOUS ANNULAR LIP

RELATION TO OTHER APPLICATIONS

This application is a continuation-in-part of my co-pending application, Ser. No. 368,250, filed Jun. 19, 1989, abandoned which is a continuation of application Ser. No. 335,767, filed Apr. 10, 1989, now U.S. Pat. 4,951,830, which is a continuation-in-part of my application Ser. No. 947,043, filed on Dec. 29, 1986, now U.S. Pat. No. 4,819,906, which is a continuation-in-part of parent application Ser. No. 709,534, filed Mar. 8, 1985 now U.S. Pat. No. 4,632,265, which is a continuation-in-part of parent application Ser. No. 507,342, filed on Jun. 24, 1983, now abandoned.

BACKGROUND OF INVENTION

1. Field of Invention

This invention relates to a closure for bottles and, in particular, to a snap-on closure.

2. Brief Statement of the Prior Art

Bottle closures are commonly molded of plastic and are of two types. One type is a twist-on closure or screw closure that engages a threaded neck finish and is applied by threading it on the neck of the bottle. The other type of closure is a snap-on closure which has a peripheral skirt which receives the neck of the bottle and one or more annular beads on its inside wall that snap into receiving grooves of the neck finish of the bottle. Typically, at lease two grooves and beads are provided with a tear tab between the two beads and score lines in the skirt to permit severing of the closure into a reclosure lid and a throw away tear band.

The snap-on closures have frequently been provided with a center corking skirt which is intended to seal the mouth of the bottle. The plastic bottles are blow-molded and the neck finish is achieved with dies commonly referred to as shear steel and neck rings. With frequent or prolonged use, the close tolerances of these dies can be lost with the result that the thicknesses of the neck walls can vary significantly from the original specifications. Furthermore, lack of precise control in manufacturing of the closures frequently results in closures in which the tolerances are not carefully controlled. Difficulties are experienced in the capping operations from both of these causes, and are aggravated by the trend to very light-weight plastic dairy containers, such as the 50-gram gallon container. To illustrate, flashing is trimmed from the neck of the containers during their manufacture and, sometimes, this trimming is imperfect so that necks are obtained which are not perfectly in round or in which the flashing is not completely removed. The result of these fabrication errors is that the container neck frequently wedges between the inner and outer skirts of the closure, lifting the closure or preventing the closure from securely seating.

Consequently, the corking skirt has been designed with minimal dimensions to avoid interference with outsized bottle necks that would prevent the closures from seating on the bottles. This, however, requires that the corking skirt be undersized, and results in loss of the sealing capability of the corking skirt and these closures are notoriously "leakers" in the industry.

Seals of various designs have also been used for the snap-on closures to improve the poor sealing capability of the corking skirt closures. Liners have been ultrasonically and thermally bonded to bottle necks. These seals, however, have only complicated the closure design and increased its manufacturing and application costs.

Manufacturers of press-on closures have also avoided split cavity molds, i.e., molds which split along axially to the plane of the closure, because of their high complexity and cost. Consequently, the tab on the tear band of the closure of one manufacturer is formed on the lower edge of the closure skirts, and a spiral groove is formed starting on the lower edge of the cap skirt and passing upwardly to form a spiral tear band, as in U.S. Pat. No. 3.338,446. Closures of this design, however, are prone to split during the capping operation, since the spiral tear band weakens the bottom edge of the skirt, and caps have a tendency to split along the spiral tear. Other manufacturers have avoided the splitting problem with entirely annular tear bands having lateral tear tabs, however, such closures do not have annular lips on the reclosures, and for this reason are inconvenient to the consumer. Other solutions have provided entirely annular bands, however, these caps leave the lower band of the skirt around the bottle neck after removal of the tear band, and this is also objectionable in some applications.

In my prior patent, U.S. Pat. No. 4,032,029, I disclosed a closure with an annular tear band and tab, and an annular lip. While this closure was a substantial improvement over the aforementioned closures, its manufacture requires a split cavity mold, and it also utilized a less than ideal center corking skirt.

OBJECTIVES OF THE INVENTION

It is an object of this invention to provide an improved snap on closure for a bottle.

It is also an object of the invention to provide the a snap on closure with a tear band which completely separates from the bottle.

It is an additional object of the invention to provide the aforementioned closure having a tear band which does not weaken the lower edge of the cap skirt, thereby insuring that the skirt does not split during application of the cap.

It is a further object of the invention to provide the aforementioned snap-on closure with either a sealing gasket, or a corking skirt on the undersurface of the cap, which effectively seals the mouth of a bottle.

It is also an additional object of this invention to provide a snap-on closure which can be molded in a manufacturing mold having a single parting surface.

It is also a further object of the invention to provide the aforementioned closure with a radially projecting tear tab.

It is a further and additional object of the invention to provide a cap which readily rolls down a cap chute during the caping operation.

BRIEF DESCRIPTION OF THE INVENTION

This invention comprises a snap-on closure which has upper and lower annular beads on the inside wall of a peripheral skirt with a tear band defined by a score line in the skirt, located between the annular beads. The score line extends towards, but not entirely to, the bottom edge of the skirt, terminating a short distance above the bottom edge of the skirt. This score line permits a tearing of the lower portion of the cap skirt from the closure, and for this purpose, the cap tears along the weakened score line, about the closure and then downwardly towards the bottom edge of the skirt so that the entire lower portion of the skirt is removed as a tear band, leaving only the reclosure on the bottle.

Since the lower score line does not extend to the lower edge of the skirt, that lower edge is not weakened, but retains its full hoop strength, to resist splitting when the cap is applied to the bottle.

DESCRIPTION OF PREFERRED EMBODIMENTS

When references are made to the accompanying drawings the similar characters of reference represent corresponding parts in each of the several figures.

Figure 1:
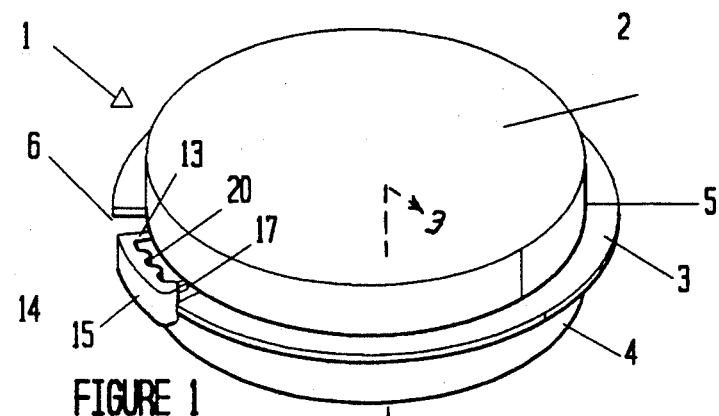
FIG. 1 is a perspective top view of the preferred form of the closure of the invention.
Figure 2:
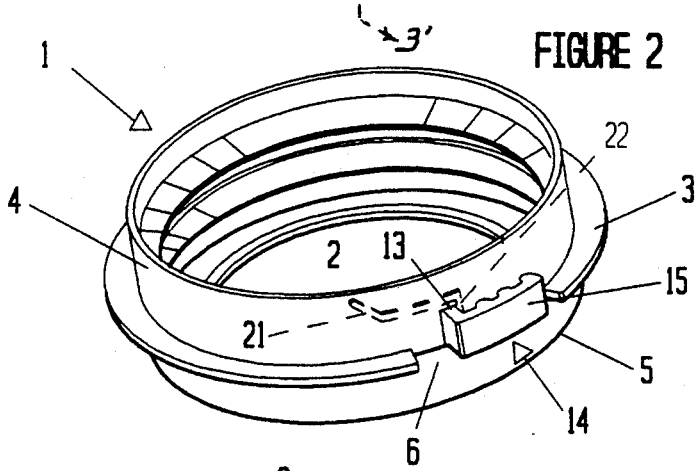
FIG. 2 is a perspective bottom view of the closure shown in FIG. 1.
Figure 4:
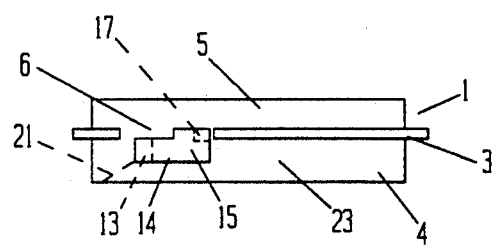
FIG. 4 is an elevational view of the closure.

As shown in FIGS. 1, 2 and 4, the closure 1 is constructed in accordance with the present invention from a resilient and moderately flexible plastic substance that will deform slightly to snap on and snap off a container. Exemplary plastic materials which may be employed include polyethylene, polystyrene, polyvinyl chloride, polyacrylates, polyamides, polypropylene, etc. The preferred plastics are polyethylene and polystyrene.

Closure 1 has three major external structural elements; a top disk 2, a single downwardly dependent skirt 4, and a partial annular lip 3 about its upper portion 5. The top disk 2 is preferably a flat circular plate having a substantially planer exterior surface. The flat exterior surface provides a convenient place for labels or instructional material. While the disk can have a shape other than circular such as rectangular, oval, etc., the circular shape is preferred. The annular lip 3 extends outwardly from the skirt a slight distance to provide a convenient grasping tab for the removal of the upper portion 5 (reclosure) of the closure from the container once the tear band, described hereinafter, has been removed. As illustrated, lip 3 is discontinuous in the area 6, immediately above tear tab 14. A greater portion of lip 3 can be omitted, if desired, provided a sufficient area is present to permit one to lift up on the closure with one's fingers or thumb. Thus, the consumer, after removing the tear band from the closure, can open the container by applying pressure upwardly on the lip 3 by a thumb or finger. This section will unseat the upper bead from the upper groove and allow the closure to slide off the container neck in the manner described hereinafter.

The tear tab 14 has a radial leg 13 which is integral with the skirt 4 and also integral with a lateral leg 15. Leg 13 is a convenient height for ease of grasping by the user. The leg 15 can be secured to the skirt 4 by a small, integral leg 17 which extends between the leg 15 and skirt 4. This, however, is an optional and not essential feature.

FIG. 2 shows the lower score line 21 in a hidden object line, as this score line is on the inside wall of the skirt 4. It is desirable to remove completely the portion of the closure below the score line which 10. A short vertical score line 22 also extends downwardly from the upper edge of the score line 10 to a point adjacent to, but separated slightly from, the bottom edge of skirt 4. The weakened short vertical score line 22 extends axially on the inside wall of skirt 4 substantially adjacent to tear tab 14 immediately behind the radial leg 13 of the tear tab 14. The vertical score line 22 is provided so that the tear tab 14 may be separated and torn free form the reclosure 5 when the user pulls on the tear tab 14. Preferably, the score line 22 has substantially the same cross section as the score line 10.

As shown in FIG. 4, the score line 21 can also be helical and extend along the inside wall of the closure. This avoids a vertical weakened line which could have a tendency to split during application of the closure to a bottle. When the tear tab 14 is pulled, it will thus completely separate the reclosure portion 5 from the lower portion 23 of the closure. As the lower portion is also torn along score line 21, it will be completely separated from the bottle neck.

Figure 3:
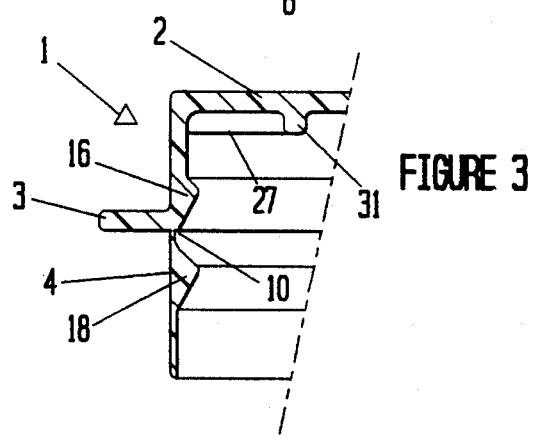
FIG. 3 is an elevational sectional view along line 3—3' of FIG. 1 showing the preferred compressible gasket seal.

Referring now to FIG. 3, a view is shown along line 3—3' of FIG. 1. The skirt 4 of closure 1 is integrally attached to the top disk 2 and extends substantially perpendicularly from the undersurface of the disk. The skirt 4 is a thin-walled cylindrical shell and is composed of the thin shell, an upper score line 10, an upper circumferential bead 16 and a lower circumferential bead 18.

The thickness of the skirt is not critical to the practice of this invention as long as the closure is sufficiently resilient to allow the internal beads 16 and 18 to expand over the wide areas of the container neck and snap into the container grooves without tearing the closure or container. Generally, however, the skirt thickness is governed by economics with the thinnest walled functional closure being preferred. Usually, the skirt will have a thickness ranging from 0.3 to 1.5 millimeters and more usually from 0.5 to 1.2 millimeters.

The upper score line 10 is an annular groove in the inside wall of the skirt 4 and extends circumferentially about the skirt 4. Preferably it is a triangular shaped groove, i.e., V-groove which extends into the skirt approximately 0.15 to 0.5 times the thickness of skirt 4. The lower portion 23 of the skirt 4 beneath score line 10 constitutes a tear band. This tear band is removed when the consumer opens the container and, after it is removed from the closure, it can be discarded.

The lateral tear tab 14 (see FIGS. 1 and 2) remains attached to the lower portion 23 and is discarded by the user after separation from the reclosure 5. The tear tab 14 may be any laterally projecting tab which permits the consumer to easily grasp it. In a preferred embodiment, the tab 14 has a radial leg 13 which extends laterally outwardly from the skirt 4 and a lateral leg 15 which extends circumferentially, parallel to the skirt 4. The tab 14 is of sufficient width for ease in grasping the tab and removing the tear band. In order to increase the friction between the fingers and the tear tab, the tab 14 can be provided with serrated grooves 20.

Preferably, the undersurface of closure 1 has an annular, raised rim 31 about its periphery, to provide an annular recess which is filled by a sealing gasket, described in greater detail hereinafter with reference to FIG. 5.

Figure 5:
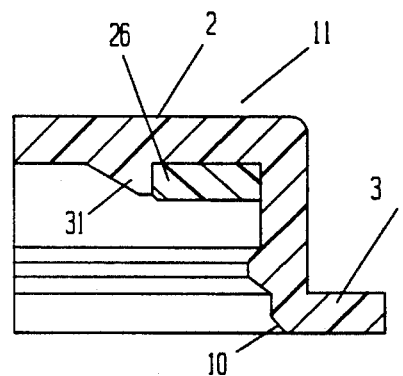
FIG. 5 is an enlarged, partial sectional view of the reclosure of FIG. 6.
Figure 6:
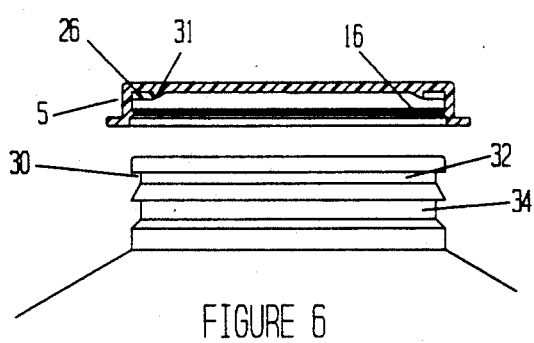
FIG. 6 is a sectional view of the reclosure formed from the closure of FIGS. 1-4 in exploded view relative to the neck of a bottle.
Figure 7:
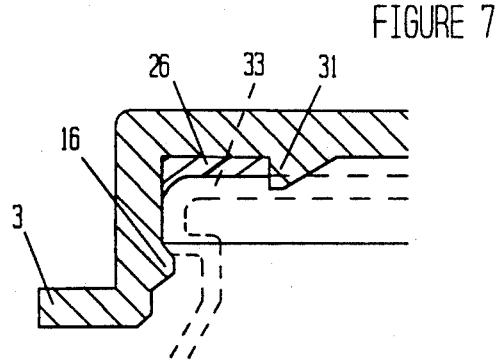
FIG. 7 is an enlarged partial sectional view of the reclosure of FIG. 6 seated on a bottle showing the compression sealing of the gasket seal of the closure.

Referring now to FIGS. 5-7, the sealing liner 26 is shown in the reclosure 5. Received within the reclosure 5 is a compressible gasket 26 which is formed of suitable compressible plastic such as polyethylene, polyurethane, polystyrene, etc. A suitable material is a thermoplastic hot meld having a high elasticity. An example of a commercially available material is product S-314-434A from Bostik which has about 520 percent elongation at break point and a tensile strength of about 140 psi. This material can be applied in a foamed or unfoamed state. Other plastic foams can be used and are preferably of low density, e.g., about 0.5 to about 2 pounds per cubic foot. The gasket 26 is relatively thin, e.g., from about 0.1 to about 0.25 inch, preferably from about 0.1 to about 0.125 inch in thickness. The gasket is formed of plastics which are resistant to liquid permeation, and when used in a foamed state, the foams are formed of closed cells, to be impermeable to liquids. The gasket 26 can be formed during the formation of the closure, and for this purpose, a polyolefin liquid resin, which cures to a polyolefin foam can be injected into the mold cavity as a preliminary step to the injection molding of the closures. Once the polyolefin foam is injected and the foam gasket 26 is formed, the injection molding of the closure proceeds with the formation of a closure having a firmly bonded gasket 26 on its undersurface. The gasket 26 can be subsequently formed or bonded to the undersurface of closure 26, either by bonding a preformed and precut gasket 26 or by applying the liquid plastic onto the previously formed closure. This is the preferred application with the hot melt gasket material previously described. For this application, the recess 33 about the periphery of the undersurface of the closure, which is formed by the raised rim 31 is filled with the molten gasket material in a finishing operation, after the caps are molded. Alternative, the gasket 26 can be die cut from sheet stock and applied to the undersurface of the closure. In either application, the recess 33 formed by raised rim 31 is a preferred feature to facilitate application of the gasket 26 to the closure 1.

As shown in FIG. t, the bead 16 is discontinuous, with an open area 19.

As shown in FIG. 6, the bottle neck 30, which receive the beads 16 and 18 of the closure 1. The neck finish of the bottle comprises a cylindrical wall having a plurality of V-grooves (annular grooves 32 and 34), which are spaced apart by a distance corresponding to the vertical distance between the upper and lower beads 16 and 18 on the inner side wall of the cylindrical skirt 4. The upper groove 32 thus is a seat for the upper bead 16 of the reclosure 5 to lock the reclosure 5 to the neck 30. The lower groove, of course, receives the lower bead 18 shown in FIG. 3, when the closure 1 is pressed over the neck at the bottling operation.

The mouth of the bottle is encircled by an annular lip 33 (shown in phantom lines in FIG. 7) which seats against the gasket 26. The gasket 26 engages the lip 33 in a resilient seal, and for this purpose, the width of the gasket 26 is slightly greater than the width of the lip 33, insuring resilient compression of the gasket 26 when the reclosure 5 is placed on the bottle neck.

FIG. 7 shows the bottle neck 30 with lower portion 23, which forms a removable tear band separated and removed from the upper reclosure portion 5. The upper annular groove 32 of the neck finish receives the upper bead 16 which remains on the reclosure 5.

Bead 16 is in the inside wall of upper reclosure 5, and functions by reseating in groove 32 of bottle neck 30. The upper bead 16 is disposed above score line 10, between score line 10 and the undersurface of disk 2. The lower circumferential bead 18 (FIG. 3) is disposed below the second score line 24. The beads 16 and 18 are substantially uniform raised surfaces projecting inwardly from the skirt. The beads may be continuous about the entire periphery of the inner wall of skirt 4 or, alternatively, may be discontinuous. The cross-sections of the beads can be semi-circular, however, they are preferably triangular with inclined sidewalls, as shown in FIG. 3. The triangularity of these beads is preferred for ease in capping, removal and re-application of the closure since the inclined surfaces of the triangular cross-sectional beads transmit axial force applied to the closure in an outward, radial direction thereby urging the grooves to seat or unseat from the grooves in the neck finish of the container. The inclined sidewalls also facilitate manufacture in ease of ejection of the closures from the molds used to fabricate the closures.

The reclosure 5, as previously mentioned, is formed by pulling tear tab 14 which removes the lower portion below the score line 10 from the remainder of the closure. This leaves a reclosure 5 having the top disk 2, the upper portion of the peripheral skirt 4 that includes the upper annular bead 16 on its inside wall that is directly opposite the discontinuous annular lip 3. One of the advantages of this closure is that variations of the closure can be produced with the same mold cavities, only by replacing the cores of the mold. One variation is to substitute a sealing liner for the corking skirt.

Figure 8:
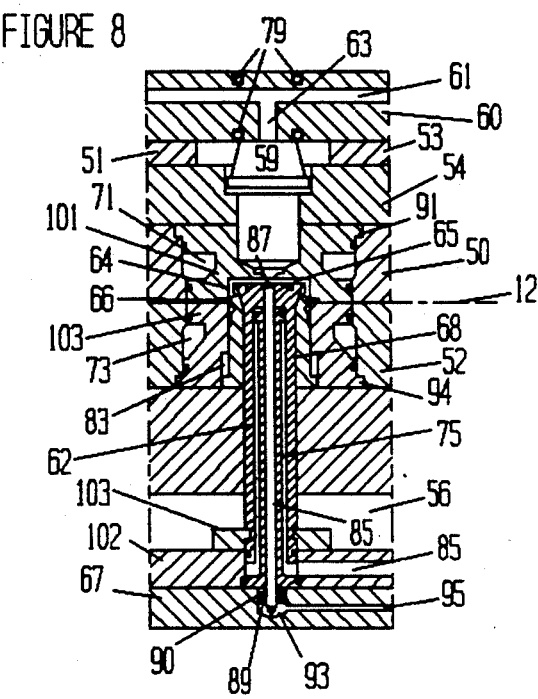
FIG. 8 is an elevational sectional view of a mold to manufacture the closures.
Figure 9:
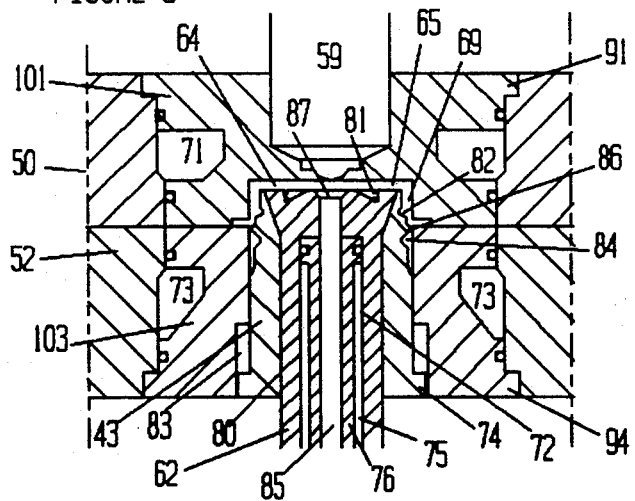
FIG. 9 is an enlarged sectional view of the mold cavities of FIG. 8.

Referring now to FIGS. 8 and 9, the mold and its operation for the production of the closures of this invention will be described. FIG. 8 is an elevational sectional view through one cavity of a multi-cavity mold, and FIG. 9 is an enlargement of the mold cavities and surrounding members of the mold. The closures are preferably made by injection molding and the mold described hereinafter is intended for this manufacturing method.

The parting line for the mold is line 12 which lies along the bottom surface of the lip 3 (see FIG. 2) of the closure. The center die plate 50 receives the mold insert 101 which is retained therein by an annular shoulder 91. The mold insert 101 has a cylindrical recess 64 and a surrounding annular recess 66. The cylindrical recess 64 corresponds in depth to the height of the reclosure 5 and the annular groove 66 corresponds in width and thickness to the lip 3 of the closure. This recess is coaxial with a cylindrical bore 68 in the opposite mold insert 103 which is received in die plate 52 and secured therein by an annular shoulder 94. The bore 68 has a depth corresponding to the width of the skirt 4 of the closure beneath its lip 3.

A movable core 62 and surrounding core sleeve 43 (see FIGURE 9) are slidably received in bore 68. As shown in FIG. 9, core 62 extends into cylindrical recess 64, terminating short of the top of the recess, thereby forming a flat circular cavity 65, which forms the top disc 1 of the closure. The diameter of the upper end of core sleeve 43 is also less than the diameter of the recess 64 and of cylindrical bore 68, to provide a cylindrical cavity 69 to form the skirt 4 of the closure. This cavity 69 is contiguous to flat cavity 65.

Core sleeve 43, at preselected locations, is provided with upper annular groove 82 and lower annular groove 84. These grooves form the annular beads 16 and 18, respectively, of closure 1. These grooves can be discontinuous to provide discontinuous beads about the periphery of inside wall of closure 1 or can be continuous, as desired.

As previously mentioned, a peripheral score line 10 is molded into the closure 1 to provide separation between the reclosure 5 and the lower portion 23, the annular tear band. This score line is provided by the annular bead 86 which is located on core 62, between the upper annular groove 82 and lower annular groove 84. The bead 86 extends into the annular cavity 69 between the core 62 and bore 68 of the outer mold plate 52. Location of the score line 10 on the inside wall of the closure 1 avoids the need to use molds which split in a plane axial to the cavity.

Molten polymer is injected into the mold through a distributor 60 which has a conventional hot gate 59 that controls the injection of the polymer. The molten polymer is supplied through internal passages 61 and 63 of the distributor 60. The polymer is maintained at desired temperatures by electrical heaters 79 in distributor 60 and similar heaters (not shown) in hot gate 59. The upper end of hot gate 59 is surrounded by spacer blocks 53 and 51. The polymer is injected into cavity 65 and flows downwardly filling cavity 69. Polymer flow into the cavity is controlled by the hot gate 59 which is operative to open and close at preselected times during the molding cycle.

The mold is provided with annular cavities 71 and 73 in plates 50 and 52, respectively, which surround the mold cavities. Cooling water is circulated through these cavities to control the mold temperature, and permit the polymer to solidify within cavities 65 and 69.

The core assembly housed in core sleeve 43 is slidably received in bore 72. Core sleeve 43 has a distal annular shoulder 74 (see FIG. 9) and the limit of travel of the core sleeve 43 is set by the depth of counter bore 83 which receives the shoulder 74.

As shown in FIG. 9, core 62 has a central, longitudinal bore 72 which receives the inner core sleeve 76. Sleeve 76 is of lesser diameter than bore 72, forming annulus 75 which receives cooling water through passage 85 in plate 102 (see FIG. 8). Core 62 is secured to plate 102 with block 103. As shown in FIG. 8, the space 56 above block 103 is open to permit relative movement of the core assembly.

A rod 85 is slidably received in sleeve 76 and has a tapered head 87 which serves as an air valve closure. The opposite end of rod 85 is received in chamber 93 of plate 66 (see FIG. 8). The rod 85 has a distal spring retainer 89 capturing a compression spring 90 beneath the lower end of sleeve 82. Compressed air is supplied to chamber 93 through passage 95 and serves during ejection to lift rod 85 sufficiently to open the passage through sleeve 76, permitting air to lift the molded closure from the end of core 62.

Figure 10:
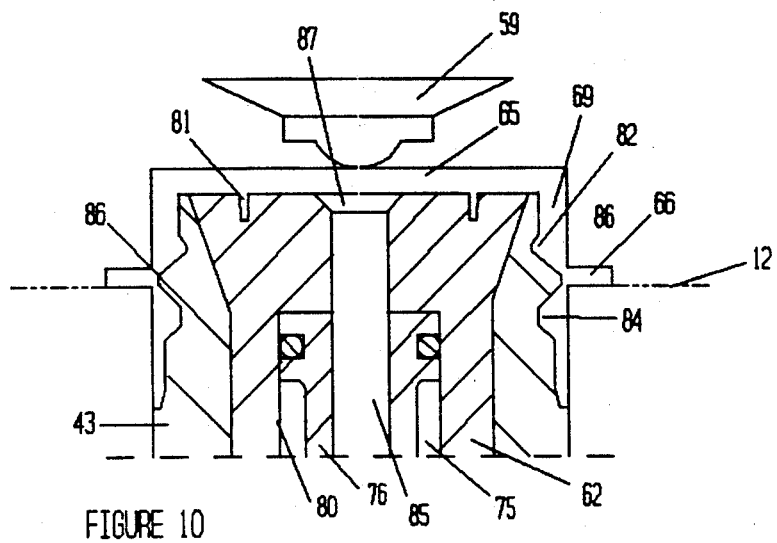
FIG. 10 is an enlarged sectional view of the mold cavity of FIGS. 8 and 9.
Figure 11:
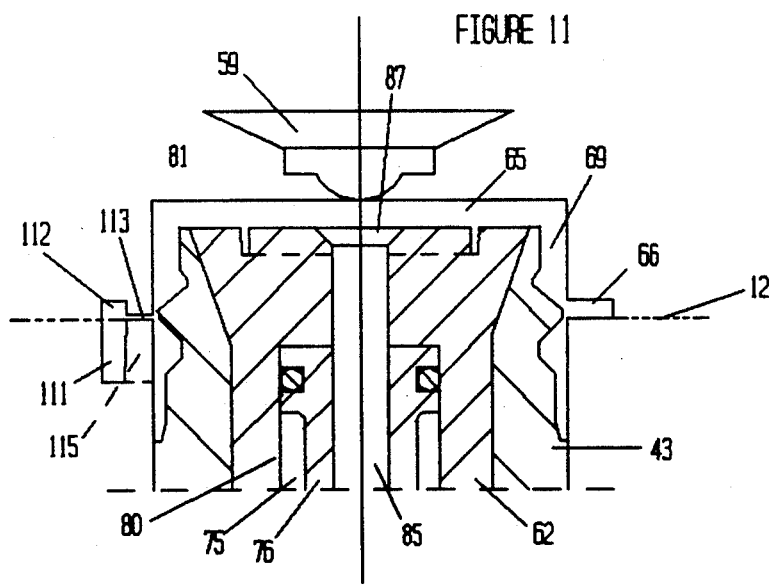
FIG. 11 is an enlarged sectional view of the mold cavity of FIGS. 8 and 9 taken through the tear tab cavity.

The mold cavities are shown in greater detail in FIGS. 10 and 11. The upper end of the core 62 has an annular recess 81 which forms the raised rim 31 that forms recess 27 to receive the gasket 26 (see FIGS. 3 and 5). The sectional view of FIG. 10 is taken across the mold through both sides of annular cavity 66 that forms lip 3 of the closure.

FIG. 11 is a sectional view through the lateral cavities that form the tear tab. These cavities include a short arcuate cavity 111 that forms the lateral leg 15 of the tear tab which is contiguous with a radial cavity 115 which forms the radial leg 13 of the tear tab. The mold parting line 12 separates the cavity 111 into a lower cavity and an upper cavity 112. Also, a very small, radial cavity 113 extends between cavity 112 and 69 to form the attachment leg 17 which extends between the end of the tear tab 14 and the skirt 4.

In operation, the outer cavity plates 52 are pressed against the opposite faces of the stationary mold plate 50 and the cores 62 are fully advanced into the outer mold plates 52 by compression of the core plates 56. The plates 60 are located at their position shown in FIG. 8 with their end surfaces flush with the surrounding ends of cores 62. The mold plate 50 which has been preheated with suitable heating means such as electrical conductors and the like is supplied with molten molding resin such as low density polyethylene through a supply conduit, not shown. Passageways internal of the mold plate 52 communicate with the mold feeder passageways 63 to supply the molding resin at a high pressure, e.g., 2000 to about 3500 psi., into the mold cavity. The molding resin is injected into the mold cavity by retraction of the hot gate 59. When the cavity is filled, gate 59 closes. The mold plates 50 and 52 are cooled sufficiently about the mold cavity by heat exchange with a cooling fluid so that the molten plastic gels after it is injected into the mold cavity. For this purpose, plates 50 and 52 have internal passageways 71 and 73, for circulation of a heat exchange fluid. Once the plastic within mold cavities 65 and 69 gels and begins to solidify, the plate 52 is retracted from stationary plate 50, leaving formed closures on the ends of each of the cores 62. Once the outer cavity plate 52 has cleared the lower ends of the closures formed on the cores 62, the cores 62, which comprise runners are moved forward, past the ends of the core sleeves 43, lifting the formed closures from the core sleeves 43. Although the invention has been illustrated with reference to mechanically actuated runners for ejection of the molded closures, this function can equally be accomplished by discharging a compressed fluid such as compressed air through valve passageways in cores 62 when it is desired to eject these closures.

The closures of the invention are thus capable of manufacture without the use of split-cavity molds, i.e., cavities split along the longitudinal axis of the mold cavity. The closures, however, are provided with annular lips 3 and immediately subjacent lower portions 23 having dependent, laterally projecting tear tabs 14. The tear tabs have a width sufficient to provide a surface for grasping by the user. The closure of this design thus provides reclosure closures 5 and annular skirts 4 of maximum height. Since the annular lip 3 is located substantially across from the inner bead 16 of the reclosure, the lip is at its most effective position for removal of the closure with the application of an upward pressure. If desired, the tear tabs 14 can be tacked to the skirt 4 at its trailing end, a construction which insures that the closures will feed smoothly through closure chutes and conveyors of the capping machine since the tear tabs will not interlock. The caps also have the advantage of being able to roll down a cap chute, and for this purpose, the tear tab of each cap projects out the same distance as its annular lip, i.e., is of the same diameter as its annular lip. This avoids any flat spots or obstructions on the circumference of the caps that could prevent free rolling of the caps in the cap chute. The closures 1 also resist splitting during application, as the score line 21 does not extend to the bottom edge of the skirt 4, but instead terminates adjacent to, but short of the bottom edge. This insures that the full hoop strength of the skirt 4 is present to resist splitting during application of the closures.

The closures also have the advantage of a very tight seal because of the compression of the lip of the bottle against the gasket liner 26. The particular gasket material is very advantageous in sealing, as it provides a highly adherent or tacky surface to seal against the lip 33 of the bottle. The gasket must also be sufficiently compressible that the force necessary to compressively deform gasket 26 sufficiently to conform to all manufacturing variations in the lip 33 of the bottle is accomplished within the limited compressibility available for a press on closure. That available compressive force is limited to that force which is insufficient to loosen the reclosure 5 from the bottle neck, i.e,. insufficient to dislodge bead 16 from its mating groove 32 in the bottle neck.

The invention has been described to the illustrated and presently preferred embodiments. It is not intended that the invention be unduly limited by this disclosure of preferred embodiments. Instead, it is intended that the invention be defined by the means, and their obvious equivalents, set forth in the following claims.

What is claimed is:

1. In a snap on closure to be received over the neck of a bottle, and having a body formed by a top disc and a downwardly dependent cylindrical peripheral skirt, at least one annular bead on the inner wall of said skirt and sealing means on the undersurface of said disc for engagement against the neck of said bottle received in said closure, the improvement comprising:
    a. an annular lip integral with said body, of a greater diameter than said cylindrical skirt and extending exteriorly about said skirt, and located beneath said top disc, intermediate the height of said skirt;
    b. at least one score line extending circumferentially about said skirt, beneath said annular lip, to provide a weakened tear line in said skirt to form a tear line permitting complete severing of the closure into a top reclosure portion and a lower portion;
    c. a tab having a leg portion extending from said skirt beneath said score line and projecting outwardly from said skirt, and an arcuate trailing portion having a diameter substantial the same as the diameter of said annular lip, and located immediately beneath said score line; and
    d. a single discontinuous area in said lip located only in the area immediately above said tear tab.

2. The snap on closure of claim 1 wherein the end of said trailing portion of said tear tab has a leg which extends into integral connection with said body.

3. The snap on closure of claim 1 wherein said arcuate trailing portion of said tear tab extends circumferentially parallel to said skirt.

4. The snap on closure of claim 1 including upper and lower, spaced-apart score lines which define a tear band therebetween.

5. The snap on closure of claim 4 wherein the trailing portion of said tab has a width greater than the width of said tear band.

6. The snap on closure of claim 1 including a second score line located beneath said first score line to form a tear band extending about said skirt, said second score line also extending downwardly towards the bottom edge of said skirt, and terminating above said bottom edge whereby said bottom edge is unrelieved in thickness.

7. The snap on closure of claim 1 including at least two annular beads on the inside wall of said peripheral skirt.

8. The closure of claim 1 wherein said sealing means comprise a sealing gasket on the undersurface of said disc.

9. The combination of the closure of claim 1 with a bottle having a neck with a neck finish having at least one annular groove about its outer wall which receives said annular bead on the inside wall of said skirt.

10. The combination of claim 9 wherein said bottle neck has two, spaced-apart annular grooves and wherein said closure has coacting and spaced-apart annular beads on he inside wall of its skirt aligned with and received in said annular grooves.

11. The combination of claim 9 wherein said sealing means of said closure comprises a sealing gasket on the undersurface of said disc.

12. The closure of claim 1 wherein said annular bead has a triangular cross section.

13. The closure of claim 1 wherein said annular bead is discontinuous about the inner wall of said skirt.

* * * * *